(12) United States Patent
Wu et al.

(10) Patent No.: US 10,489,630 B2
(45) Date of Patent: *Nov. 26, 2019

(54) SURFACE TEXTURE INFORMATION COLLECTOR, SURFACE TEXTURE INFORMATION COLLECTION METHOD, AND DISPLAY DEVICE

(71) Applicant: BOE TECHNOLOGY GROUP CO., LTD., Beijing (CN)

(72) Inventors: Chun Wei Wu, Beijing (CN); Xue Dong, Beijing (CN); Haisheng Wang, Beijing (CN); Yingming Liu, Beijing (CN); Xiaoliang Ding, Beijing (CN); Jing Lv, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 72 days.

This patent is subject to a terminal disclaimer.

(21) Appl. No.: 15/760,105

(22) PCT Filed: Jul. 21, 2017

(86) PCT No.: PCT/CN2017/093826
§ 371 (c)(1),
(2) Date: Mar. 14, 2018

(87) PCT Pub. No.: WO2018/024118
PCT Pub. Date: Feb. 8, 2018

(65) Prior Publication Data
US 2018/0260605 A1    Sep. 13, 2018

(30) Foreign Application Priority Data

Aug. 4, 2016 (CN) .......................... 2016 1 0635106

(51) Int. Cl.
*G06K 9/00* (2006.01)

(52) U.S. Cl.
CPC .......... *G06K 9/00046* (2013.01); *G06K 9/00* (2013.01); *G06K 9/00067* (2013.01)

(58) Field of Classification Search
CPC ... G06K 9/00; G06K 9/00046; G06K 9/00067
See application file for complete search history.

(56) References Cited

U.S. PATENT DOCUMENTS 8,265,352 B1  9/2012  Neoh et al.
2009/0232362 A1*  9/2009  Otsubo .............. G06K 9/00026
                                                                    382/115

(Continued)

FOREIGN PATENT DOCUMENTS

CN    202548868 U    11/2012
CN    104182727 A    12/2014

(Continued)

OTHER PUBLICATIONS

Search Report and Written Opinion dated Oct. 27, 2017 from State Intellectual Property Office of the P.R. China.

*Primary Examiner* — Manuchehr Rahmjoo
(74) *Attorney, Agent, or Firm* — Dilworth & Barrese, LLP.; Michael J. Musella, Esq.

(57) ABSTRACT

Disclosed in embodiments of the present disclosure are a surface texture information collector, a surface texture information collection method, and a display device. The surface texture information collector includes: a contact board provided with a first surface, the first surface being configured to be in contact with a textured surface; multiple collection units, located on one side of the contact board opposite to the first surface, at least one collection unit including a photosensitive element; and a light concentration element, located between the photosensitive element and the contact board; light entering and transmitted through the contact board and (Continued)

the light concentration reaches the photosensitive element opposite to the light converging component.

16 Claims, 7 Drawing Sheets

(56) References Cited

U.S. PATENT DOCUMENTS

| | | | | |
|---|---|---|---|---|
| 2012/0256089 A1* | 10/2012 | Kanda | ............... | G06K 9/0004 |
| | | | | 250/338.1 |
| 2015/0187980 A1* | 7/2015 | Yamamoto | ............ | G06F 1/00 |
| | | | | 250/552 |
| 2017/0193270 A1 | 7/2017 | Zhang | | |

FOREIGN PATENT DOCUMENTS

| CN | 106022324 A | 10/2016 |
|---|---|---|
| CN | 106228147 A | 12/2016 |
| CN | 206058223 U | 3/2017 |
| CN | 206058224 U | 3/2017 |

* cited by examiner when a textured surface contacts the first surface of the contact plate, light emitted from the light source passes through the contact plate and is irradiated to the textured surface and then reflected by the textured surface ——S501 the light reflected by the textured surface sequentially passes through the contact plate and the light converging component and then is converged toward a main optical axis of the light converging component ——S502 the light converged toward the main optical axis of the light converging component at least partially passes through the light transmission hole and is irradiated to the light sensing component ——S503

FIG. 5

SURFACE TEXTURE INFORMATION COLLECTOR, SURFACE TEXTURE INFORMATION COLLECTION METHOD, AND DISPLAY DEVICE

TECHNICAL FIELD

The embodiments of the present disclosure relate to a surface texture information collector, a surface texture collection method, and a display device.

BACKGROUND

There are generally two existing fingerprint collecting devices. One is a capacitive fingerprint collecting device, that is, a fingerprint texture is sensed by capacitive sensing of a finger through a semiconductor chip, and the other is an optical fingerprint collecting device, that is, a fingerprint texture is sensed through optical differences caused by ridge and valley lines at an interface upon a finger touching the device. However, the capacitance fingerprint collection method has the disadvantages such as insufficient anti-static, insufficient anti corrosion capability and low fingerprint collecting sensitivity. Therefore, the optical fingerprint collection method is one of the main methods used at present.

SUMMARY

An embodiment of the present disclosure provides a surface texture information collector, comprising: a contact plate having a first surface configured to contact a textured surface; a plurality of collecting units located on a side of the contact plate opposite to the first surface, wherein at least one of the collecting units comprises: a light sensing component, and a light converging component between the light sensing component and the contact plate; light entering and passing through the contact plate and the light converging component arrives at the light sensing component opposite to the converging component.

In an example, a main optical axis of the light converging component is substantially perpendicular to the contact plate.

In an example, the light converging component is a convex lens.

In an example, a shape of an orthographic projection of the light transmission hole on the contact plate is substantially the same as a shape of an orthographic projection of the light converging component on the contact plate.

In an example, the at least one of the collecting units further comprises a light shielding component located between the light converging component and the light sensing component, wherein the light shielding component has a light transmission hole.

In an example, a center of the light transmission hole is located on a main optical axis of the light converging component.

In an example, a main optical axis of the light converging component is located in a cross section, a center of the light transmission hole and a focal point of the light converging component are located in the cross section and do not coincide with each other, a width d of the light transmission hole in the cross section satisfies: $d \leq sl/f$; where s refers to a distance between a center of the light transmission hole and a focal point of the light converging component, l refers to a maximum width of the light converging component in the cross section, and f refers to a focal length of the light converging component.

In an example, a center of the light transmission hole coincides with a focal point of the light converging component.

In an example, the contact plate is a light guide plate.

In an example, each collecting unit comprises the light shielding component and the light shielding components are located in a same layer.

In an example, each of the collecting units comprises the light converging component, and the light converging components are located in a same layer.

In an example, the surface texture information collector further comprising a processing unit connected to the light sensing component, wherein the processing unit is configured to determine surface texture information based on an electric current signal of the light sensing component.

In an example, the contact plate is a substrate that is transparent to the light.

In an example, the surface texture information comprises at least one selected from a group consisting of a fingerprint information and a palmprint information.

In an example, the surface texture information collector according further comprises a light source configured to emit light into the contact plate.

Another embodiment of the present disclosure provides a surface texture collection method of any one of the above-mentioned surface texture information collectors, comprising: upon a textured surface contacting the first surface of the contact plate, light passes through the contact plate and is irradiated to the textured surface and then reflected by the textured surface, the light reflected by the textured surface sequentially passes through the contact plate and the light converging component and then is converged toward a main optical axis of the light converging component; and the light converged toward the main optical axis of the light converging component at least partially passes through the light transmission hole and is irradiated to the light sensing component.

Still another embodiment of the present disclosure provides a display device comprising any one of the above-mentioned surface texture information collectors.

In an example, the contact plate is a display panel of a display device, and the light comes from a light emitting component of the display device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 5 is a schematic flow chart of a surface texture information collection method of a surface texture information collector according to an embodiment of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The shapes and sizes of the components in the figures do not represent real proportions for the purpose of merely illustrating the present disclosure.

Figure 1:
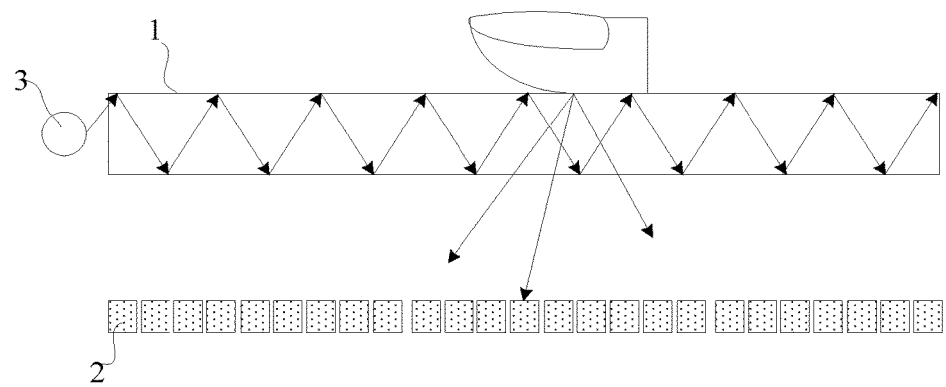
FIG. 1 is a structural schematic diagram illustrating an optical fingerprint collecting device.

As illustrated in FIG. 1, an optical fingerprint collecting device includes a light guide plate 1, a plurality of light sensing units 2 located under the light guide plate 1, and a light source 3 located at an end surface of a side of the light guide plate 1. The light emitted from the light source 3 is totally reflected in the light guide plate 1. When a finger touches the light guide plate 1, the finger breaks the condition of total reflection of the light, so a part of the light is irradiated on the finger, and the light irradiated on the finger is scattered at the finger, thus causing the light at the same position of the fingerprint to irradiate on a plurality of light sensing units 2, so that optical crosstalk occurs. Especially when a distance between the finger and the light sensing units 2 is large, the optical crosstalk problem is more serious.

Figure 2A:
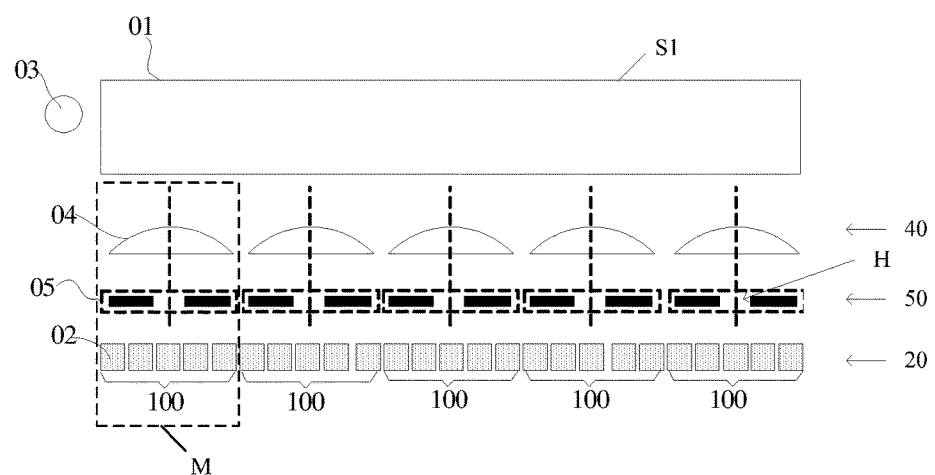
FIG. 2a and FIG. 2b are respectively structural schematic diagrams of a surface texture information collector provided by an embodiment of the present disclosure.
Figure 2B:
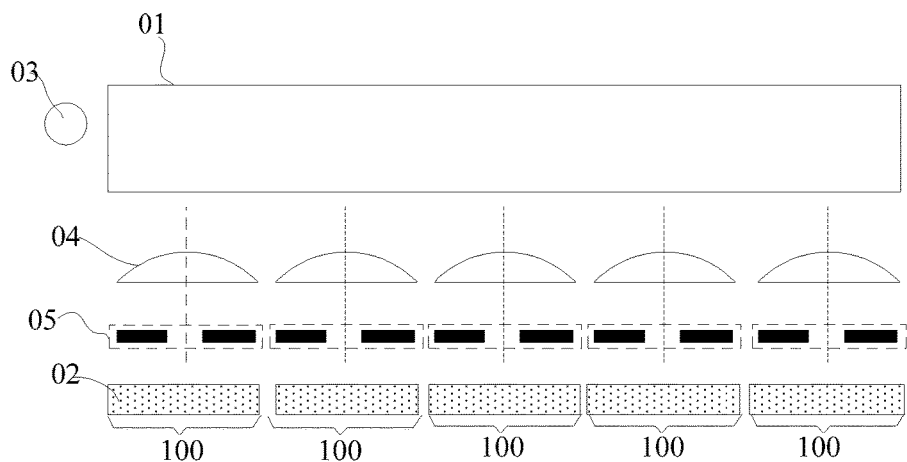

As illustrated in FIG. 2a and FIG. 2b, a surface texture information collector provided by an embodiment of the present disclosure includes a contact plate 01, a light source 03, and a light sensing component layer 20 located on a side of the contact plate 01 away from a first surface S1. For example, the light sensing component layer 20 includes a plurality of light sensing unit groups (i.e., light sensing component) 100. Each light sensing component 100 includes at least one light sensing unit 02.

The surface texture information collector further includes a plurality of converging lenses (i.e., light converging component) 04, which are in a one-to-one correspondence with the light sensing unit groups 100 and located between the light sensing unit groups 100 and the contact plate 01. The converging lens 04 is configured to converge the light incident from a side of the converging lens facing the contact plate 01 toward a main optical axis of the converging lens 04. For example, the plurality of converging lenses 04 is located on the converging component layer 40.

The surface texture information collector further includes light shielding units (i.e., light shielding components) 05, which are in a one-to-one correspondence with the converging lenses 04. The respective light shielding units are located between the respective converging lenses 04 and corresponding light sensing unit groups 100. Each of the light shielding units 05 has a light transmission hole H, and the light converged in a direction of the main optical axis of the light converging lens 04 at least partially passes through the light transmission hole of the corresponding light shielding unit 05 and is irradiated onto the corresponding light sensing unit group 100. For example, the plurality of light shielding units 05 are all located on the light shielding component layer 50.

Herein, for example, the light converging component 04, the light shielding component 05 and the light sensing element 100 corresponding to one another constitute a collecting unit M. Multiple collecting units M can be arranged in a matrix.

The surface texture information collectors provided by the embodiments of the present disclosure includes a contact plate, a light source, a plurality of light sensing unit groups, converging lenses in a one-to-one correspondence with the light sensing unit groups and located between the light sensing unit groups and the contact plate, and light shielding units in a one-to-one correspondence with the converging lenses and located between the respective converging lenses and the corresponding light sensing unit groups. Because a light transmission hole and the converging lens are disposed between each light sensing unit group and the contact plate, when a finger or a palm touches the first surface of the contact plate, light reflected by the finger or the palm is irradiated and converged toward the main optical axis of the converging lens. Moreover, due to the arrangement of the light transmission hole, only a part of the light satisfying specific conditions can be irradiated on the light sensing unit group, so that each light sensing unit group only collects light with a specific transmission direction, thereby reducing optical crosstalk. Moreover, the converging lens can increase light intensity, so as to improve touch sensitivity.

It is understood that the light shielding component in the above embodiments is not indispensable. In another embodiment, no light shielding component is disposed between each of the light converging lens 04 and the corresponding light sensing unit group 100. In this case, for example, the light converging element 04 corresponds to the light sensing unit group 100 in a one-to-one correspondence. The focal length of the light converging element 04 is selected such that the light passing through the light converging element reaches either a part or almost the whole of the light sensing surface of the light sensing element opposite to the light converging element. That is, by adjusting the focal length of the light converging element 04 so that the light passing through the light converging element does not strike outside the light sensing surface of the light sensing element opposite to the light converging element.

In the above embodiment, for example, the touch panel may be a part of the surface texture information collector, or may be adopted as, for example, a display panel of other device such as a mobile phone or a tablet.

In the above embodiments, for example, the light source 03 may be a single light emitting component such as an LED or the like, or a light emitting component of other devices such as a backlight of a display device, a self-luminous device, or the like, or external light guide.

In the above embodiment, for example, the surface texture information collector may be implemented as a separate surface texture information collection device such as a fingerprint machine, or may be used as a surface texture information collection component of other devices such as a mobile phone, a tablet, and the like.

It should be noted that the foregoing surface texture information collectors provided by the embodiment of the present disclosure can be applied not only to fingerprint collecting, palmprint collecting, or simultaneous fingerprint and palmprint collecting, but also to other textures collecting, which is not limited herein.

It should be noted that, in the above-mentioned surface texture information collectors provided by the embodiments of the present disclosure, the contact plate is configured to be in contact with a textured surface. Herein, the textured surface is, for example, a finger skin surface, a palm skin surface, or the like. For example, the contact plate can be a transparent substrate, which is not limited herein. Herein, the transparent substrate means, for example, a substrate that is transparent to the light emitted from the light source.

For example, in the above-mentioned mentioned surface texture information collectors provided in the embodiments of the present disclosure, the light sensing unit group includes at least two light sensing units disposed adjacent to each other.

For example, in the above-mentioned surface texture information collector provided by the embodiment of the present disclosure, a processing unit connected with each light sensing unit is further included, and the processing unit is configured to determine a surface texture information according to an electric current signal of each light sensing unit. The processing unit can be implemented by a circuit having digital and logic operation processing functions. For example, the processing unit can be a central processing unit (CPU), a digital signal processor (DSP), an micro control unit (MCU), a field programmable gate array (FPGA), or other integrated circuits (ASIC) and so on.

Figure 3A:
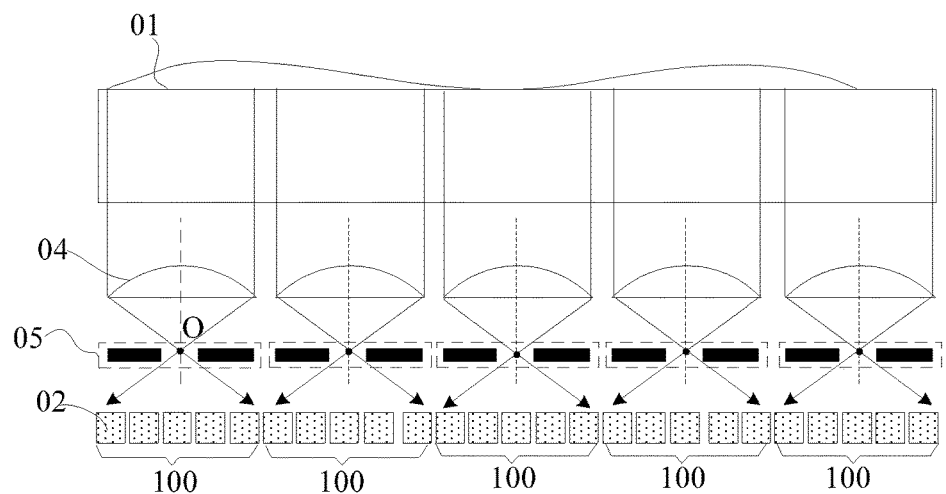
FIG. 3a and FIG. 3b are schematic diagrams of partial optical paths of a surface texture information collector when a finger touches thereon provided by an embodiment of the present disclosure, respectively.
Figure 3B:
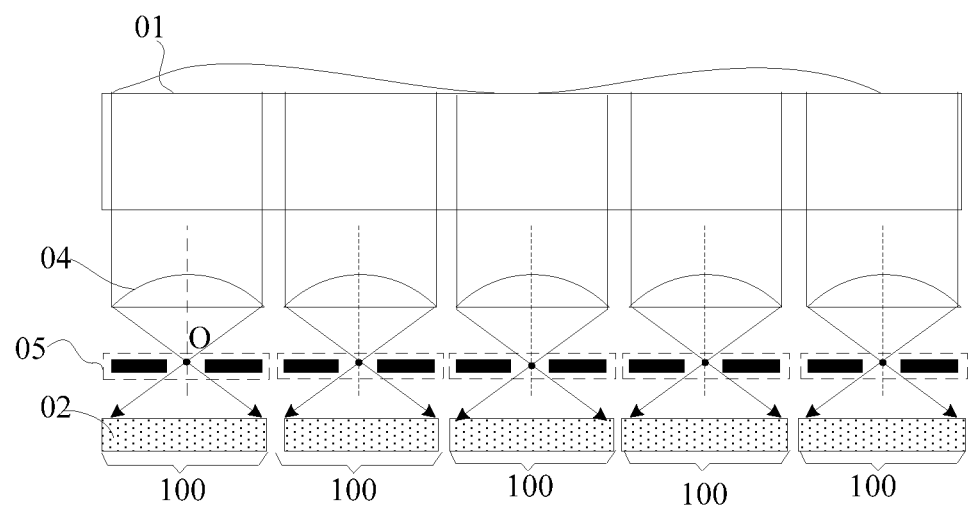

For example, in the surface texture information collectors provided in the embodiments of the present disclosure, as illustrated in FIG. 3a and FIG. 3b, the converging lens 04 is a convex lens. Because the convex lens can converge the incident light parallel to the main optical axis on the same point of the main optical axis, that is, the focal point O of the convex lens; only the incident light parallel to the main optical axis can be collected by using the light transmission hole as illustrated in FIG. 3a and FIG. 3b. In this way, each of the light sensing unit groups 100 collects only the incident light in the area covered by the corresponding converging lens 04 and in parallel to the main optical axis, and the light satisfying these conditions can only be light reflected by the fingerprint or the palm print and located in the area covered by the converging lens 04. Therefore, optical crosstalk does not occur no matter how far the light sensing unit 02 is from the upper surface of the contact plate 01.

For example, in the above-mentioned surface texture information collectors provided by the embodiments of the present disclosure, a shape of an orthographic projection of the light transmission hole on the contact plate is substantially the same as that of the orthographic projection of the convex lens on the contact plate, but the areas thereof can be the same or may be not the same. In addition, a center of the light transmission hole is located on the main optical axis of the convex lens. Herein, for example, the center of the light transmission hole means the geometric center of the light transmission hole.

It should be noted that, for example, shape substantially the same herein means that the orthographic projection of the light transmission hole on the contact plate has a shape of a circle or a square, and the orthographic projection of the convex lens on the contact plate also has a shape of a circle or a square correspondingly. However, the areas of the two circles or two squares can be equal or may be not equal.

Figure 4A:
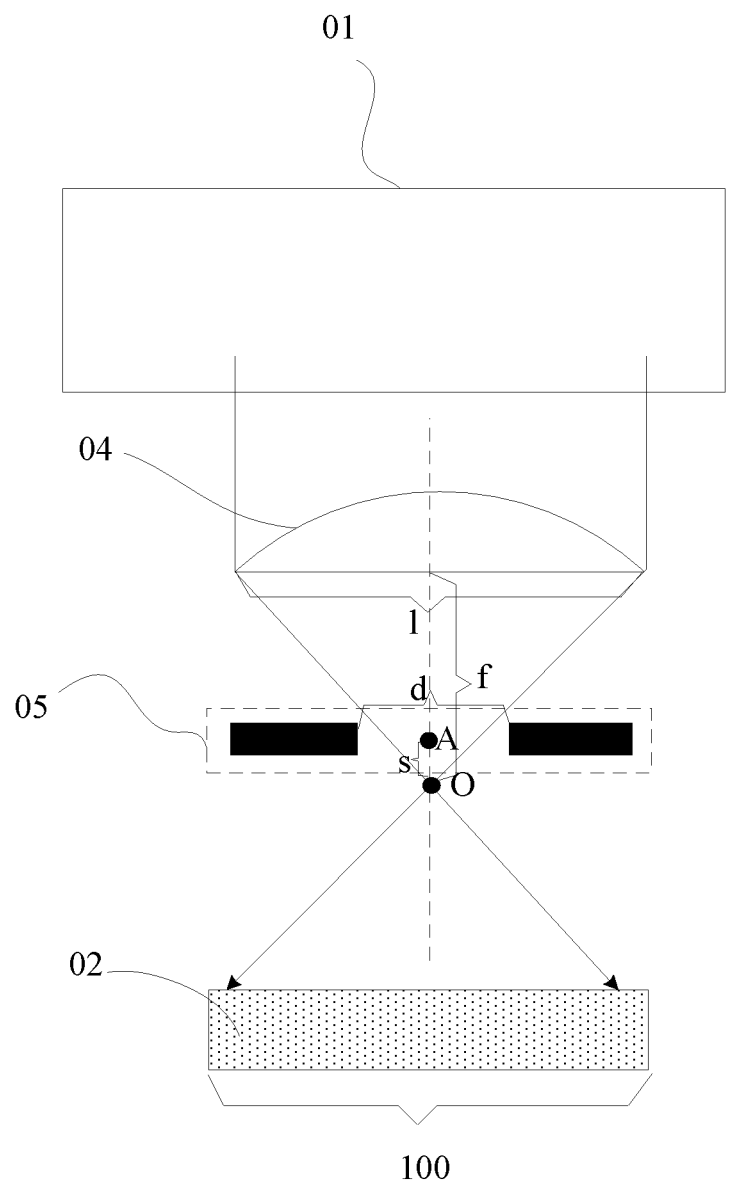
FIG. 4a to FIG. 4c are respectively schematic diagrams of a relative position between a light shielding unit and a converging lens in a surface texture information collector provided by an embodiments of the present disclosure.
Figure 4B:
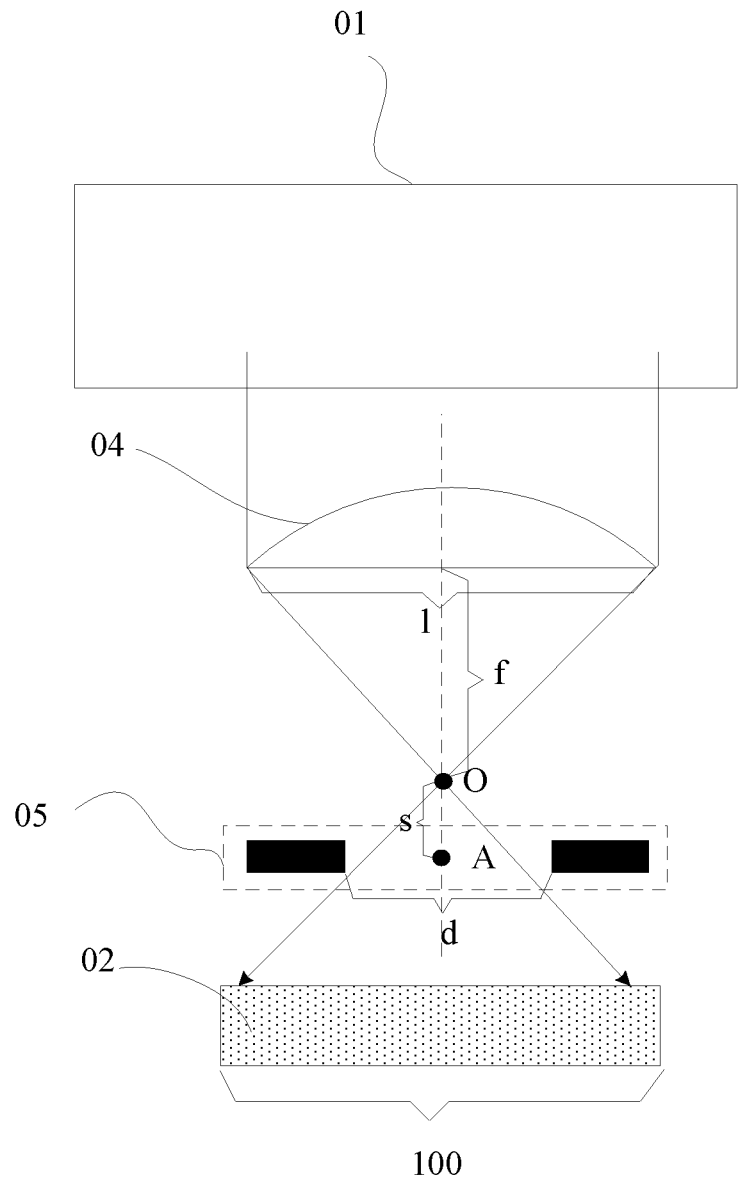
Figure 4C:
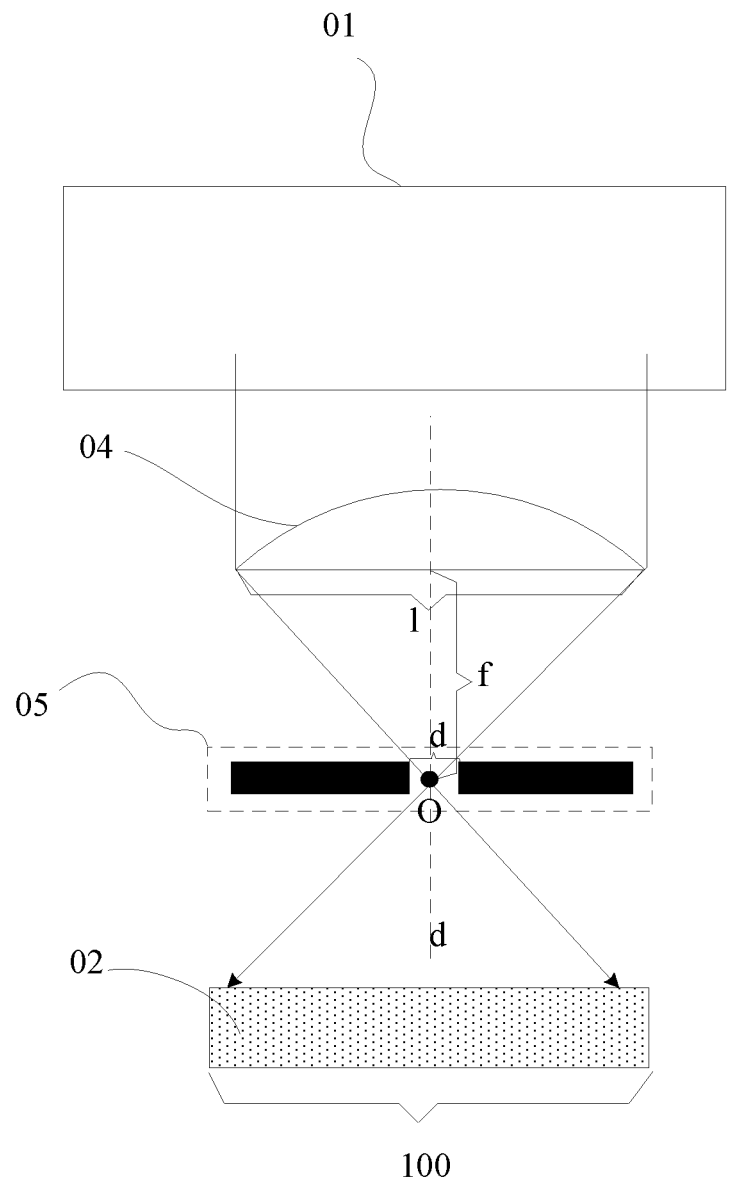

Further, in the above-mentioned surface texture information collectors provided by the embodiment of the present disclosure, as illustrated in FIGS. 4a to 4c, a width d of the light transmission hole in any cross section along the main optical axis of the convex lens satisfies: $d \geq sl/f$, where, s refers to a distance between a center A of the light transmission hole and a focal point O of the convex lens, l refers to a maximum width of the light converging component in the cross section, and f refers to a focal length of the convex lens. In this way, all the incident light perpendicular to the convex lens can pass through the light transmission hole.

For example, in the above-mentioned surface texture information collectors provided by the embodiments of the present disclosure, as illustrated in FIG. 4a, a distance between the light shielding unit 05 and the convex lens 04 can be smaller than the focal length f of the convex lens; or as illustrated in FIG. 4b, the distance between the light shielding unit 05 and the convex lens 04 can be greater than the focal length f of the convex lens; or as illustrated in FIG. 4c, the distance between the light shielding unit 05 and the convex lens 04 can be equal to the focal length f of the convex lens, i.e., the focal point O of the convex lens coincides with the center A of the light transmission hole, which are not limited herein. The relative position between the light shielding unit 05 and the convex lens can be determined according to the practical situation. However, it can be seen from the figures that the farther the light shielding unit 05 is from the focal point O of the convex lens, the larger the diameter of the light transmission hole on the light shielding unit 05 is.

For example, in the surface texture information collectors provided by the embodiments of the present disclosure, the center of the light transmission hole coincides with the focal point of the convex lens, so that the diameter of the light transmission hole can be minimized so as to avoid light converged onto other points other than the focal point on the main optical axis to be irradiated onto the light sensing unit group to the greatest extent.

It should be noted that, in the foregoing surface texture information collectors provided in the embodiments of the present disclosure, the focal point refers to a focal point located on a side of the convex lens facing the light sensing unit group.

For example, in the above-mentioned surface texture information collectors provided by the embodiments of the present disclosure, the convex lens can be a biconvex structure having two opposite protruding curved surfaces, or a plano-convex structure having one flat surface and one protruding curved surface, which are not limited herein.

For example, in the above-mentioned surface texture information collectors provided by the embodiments of the present disclosure, the contact plate is a light guide plate, and the light source is disposed on a light incident side of the light guide plate.

Further, in the above-mentioned surface texture information collectors provided by the embodiments of the present disclosure, the light source can be of a direct-lit type or a side-lit type. In a case that the light source is of a direct-lit type, the light incident side is on a side of the light guide plate facing the light sensing unit group. In a case that the light source is of a side-lit type, the light incident side is on a side surface of the light guide plate. As illustrated in FIGS. 2a and 2b, light source 03 is located on an end surface of a side of the light guide plate.

The light source of a side-lit type is used as an example. Light generated by the light source is incident on the side surface of the light guide plate. An incident angle of the light can satisfy the total internal reflection of the light in the light guide plate. When a finger or a palm presses the light guide plate, the refractive index of the finger is different from that of the air, the condition of total internal reflection of light in the light guide plate is damaged, so that a part of the light is transmitted onto the finger or palm through the surface of the light guide plate. The light is scattered by the finger or the palm of the hand to generate scattered light of various angles.

For example, in the above-mentioned surface texture information collectors provided in the embodiments of the present disclosure, the respective light shielding units 05 are located in a same layer, i.e., the light shielding component layer 50, so that they can be formed simultaneously by one patterning process. For example, corresponding portions (e.g., center points) of each of the light shielding units 05 are located in the same plane.

For example, in the above-mentioned mentioned surface texture information collector provided in the embodiments of the present disclosure, all of the light shielding units 05 are formed as a one-piece structure.

For example, in the surface texture information collectors provided in the embodiments of the present disclosure, the respective converging lenses 04 are located in the light converging component layer 40. For example, corresponding portions (e.g., left apex) of each of the light converging units are in the same plane.

For example, in the above-mentioned surface texture information collectors provided in the embodiments of the present disclosure, the light sensing units can be arranged in a matrix, which is not limited herein.

Based on the same inventive concept, the embodiment of the present disclosure further provides a surface texture information collection method of any one of the above-mentioned surface texture information collectors. As illustrated in FIG. 5, the method includes the following steps:

S501: when a textured surface contacts the first surface of the contact plate, light emitted from the light source passes through the contact plate and is irradiated to the textured surface and then reflected by the textured surface, S502: the light reflected by the textured surface sequentially passes through the contact plate and the light converging component and then is converged toward a main optical axis of the light converging component; and S503: the light converged toward the main optical axis of the light converging component at least partially passes through the light transmission hole and is irradiated to the light sensing component.

In the texture collection method provided by the embodiment of the present disclosure, when a textured surface contacts the first surface of the contact plate, light emitted from the light source passes through the contact plate and is irradiated to the textured surface and then reflected by the textured surface, the light reflected by the textured surface sequentially passes through the contact plate and the light converging component and then is converged toward a main optical axis of the light converging component; and the light converged toward the main optical axis of the light converging component at least partially passes through the light transmission hole and is irradiated to the light sensing component. In this way, each light sensing unit group only collects light with a specific transmission direction, thereby reducing optical crosstalk.

Based on the same inventive concept, embodiments of the present disclosure further provide a display device including any one of the surface texture information collectors provided by the embodiments of the present disclosure. The display device can be any product or component having a display function, such as a mobile phone, a tablet computer, a television, a display, a notebook computer and the like. For the implementation of the display device, reference can be made to the foregoing embodiment of the surface texture information collector, and details are not described herein again.

For example, the above-mentioned display device provided by the embodiment of the present disclosure further includes a display panel. The surface texture information collector can be disposed on an edge of the display panel. For example, the display panel is a cell phone. The surface texture information collector is disposed on the HOME key of the cell phone. Of course, the surface texture information collector can also be embedded in a display area of a display panel; or, the surface texture information collector can be a separate device connected with the display panel through a wire and an interface, which is not limited herein.

According to the surface texture information collector, the texture collection method thereof and the display device provided by the embodiments of the present disclosure, the surface texture information collector includes a contact plate, a light source, a plurality of light sensing unit groups, converging lenses in a one-to-one correspondence with the light sensing unit groups and located between the light sensing unit groups and the contact plate, and light shielding units in a one-to-one correspondence with the converging lenses and located between the respective converging lenses and the corresponding light sensing unit groups. Because the light transmission hole and the converging lens are disposed between each light sensing unit group and the contact plate, when a finger or a palm touches the first surface of the contact plate, light reflected by the finger or the palm is irradiated to the converging lens and is converged toward the main optical axis. Moreover, due to the arrangement of the light transmission hole, only a part of the light satisfying specific conditions can be irradiated on the light sensing unit group, so that each light sensing unit group only collects light with a specific transmission direction, thereby reducing optical crosstalk. Moreover, the converging lens can increase light intensity, so as to improve touch sensitivity.

Obviously, those skilled in the art can make various modifications and variations to the present disclosure without departing from the spirit and scope of the disclosure. In this way, if these modifications and variations of the disclosure fall within the scope of the claims of the disclosure and the equivalent technologies, the disclosure is also intended to include these modifications and variations.

The application claims priority to the Chinese patent application No. 201610635106.8, filed Aug. 4, 2016, the entire disclosure of which is incorporated herein by reference as part of the present application.

The invention claimed is:

1. A surface texture information collector, comprising:
   a contact plate including a first surface configured to contact a textured surface;
   a plurality of collecting units located on a side of the contact plate opposite to the first surface, wherein at least one of the collecting units comprises:
   a light sensing component, and
   a light converging component between the light sensing component and the contact plate;
   wherein light entering and passing through the contact plate and the light converging component arrives at the light sensing component opposite to the light converging component,
   wherein the at least one of the collecting units further comprises a light shielding component located between the light converging component and the light sensing component, wherein the light shielding component has a light transmission hole, and wherein a main optical axis of the light converging component is located in a cross section, a center of the light transmission hole and a focal point of the light converging component are located in the cross section and do not coincide with each other, a width d of the light transmission hole in the cross section satisfies:

$$d \geq sl/f;$$

wherein, s refers to a distance between a center of the light transmission hole and a focal point of the light converging component, l refers to a maximum width of the light converging component in the cross section, and f refers to a focal length of the light converging component.

2. The surface texture information collector according to claim 1, wherein a main optical axis of the light converging component is substantially perpendicular to the contact plate.

3. The surface texture information collector according to claim 1, wherein the light converging component is a convex lens.

4. The surface texture information collector according to claim 1, wherein a shape of an orthographic projection of the light transmission hole on the contact plate is substantially the same as a shape of an orthographic projection of the light converging component on the contact plate.

5. The surface texture information collector according to claim 1, wherein a center of the light transmission hole is located on a main optical axis of the light converging component.

6. The surface texture information collector according to claim 1, wherein a center of the light transmission hole coincides with a focal point of the light converging component.

7. The surface texture information collector according to claim 1, wherein the contact plate is a light guide plate.

8. The surface texture information collector according to claim 1, wherein each of the collecting units comprises the light shielding component and the light shielding components are located in a same layer.

9. The surface texture information collector according to claim 1, wherein each of the collecting units comprises the light converging component, and the light converging components are located in a same layer.

10. The surface texture information collector according to claim 1, further comprising a processing unit connected to the light sensing component, wherein the processing unit is configured to determine surface texture information based on an electric current signal of the light sensing component.

11. The surface texture information collector according to claim 1, wherein the contact plate is a substrate that is transparent to the light.

12. The surface texture information collector according to claim 1, wherein the surface texture information comprises at least one selected from a group consisting a fingerprint information and a palmprint information.

13. The surface texture information collector according to claim 1, further comprising: a light source configured to emit light into the contact plate.

14. A surface texture collection method of the surface texture information collector according to claim 1, comprising:
   when a textured surface contacts the first surface of the contact plate, light passes through the contact plate and is irradiated to the textured surface and then reflected by the textured surface,
   the light reflected by the textured surface sequentially passes through the contact plate and the light converging component and then is converged toward a main optical axis of the light converging component; and
   the light converged toward the main optical axis of the light converging component at least partially passes through the light transmission hole and is irradiated to the light sensing component.

15. A display device comprising the surface texture information collector according to claim 1.

16. The display device according to claim 15, wherein, the contact plate is a display panel of a display device, and the light comes from a light emitting component of the display device.

* * * * *